United States Patent
Kuroda et al.

(10) Patent No.: US 8,743,530 B2
(45) Date of Patent: Jun. 3, 2014

(54) ELECTRONIC COMPONENT AND SUBSTRATE MODULE INCLUDING AN EMBEDDED CAPACITOR

(75) Inventors: Yoichi Kuroda, Nagaokakyo (JP); Yoshio Kawaguchi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/291,188

(22) Filed: Nov. 8, 2011

(65) Prior Publication Data

US 2012/0113563 A1    May 10, 2012

(30) Foreign Application Priority Data

Nov. 9, 2010   (JP) .................................. 2010-251049
Oct. 5, 2011   (JP) .................................. 2011-220587

(51) Int. Cl.
   *H01G 4/228* (2006.01)
   *H01G 4/06* (2006.01)

(52) U.S. Cl.
   USPC ................................... 361/306.3; 361/321.2

(58) Field of Classification Search
   USPC .................. 361/321.2, 321.3, 306.3
   See application file for complete search history.

(56) References Cited

U.S. PATENT DOCUMENTS

| | | | | |
|---|---|---|---|---|
| 6,072,687 | A * | 6/2000 | Naito et al. ..................... | 361/303 |
| 6,191,932 | B1 * | 2/2001 | Kuroda et al. ................. | 361/303 |
| 6,243,253 | B1 * | 6/2001 | DuPre et al. ................. | 361/306.3 |
| 6,765,781 | B2 * | 7/2004 | Togashi ..................... | 361/306.3 |
| 6,967,827 | B2 | 11/2005 | Kuroda et al. | |
| 7,046,500 | B2 * | 5/2006 | Lee et al. ..................... | 361/303 |
| 7,149,071 | B2 * | 12/2006 | Mosley ..................... | 361/306.3 |
| 7,248,458 | B2 | 7/2007 | Mruz | |
| 7,292,429 | B2 * | 11/2007 | Randall et al. ................. | 361/303 |
| 7,595,973 | B1 * | 9/2009 | Lee et al. ..................... | 361/306.3 |
| 7,697,262 | B2 * | 4/2010 | Ritter et al. ................. | 361/306.1 |
| 7,724,498 | B2 * | 5/2010 | Mosley et al. ............. | 361/306.3 |
| 7,782,587 | B2 * | 8/2010 | Anthony et al. .............. | 361/118 |
| 8,238,116 | B2 * | 8/2012 | Eggerding et al. ............ | 361/794 |
| 2005/0046536 | A1 * | 3/2005 | Ritter et al. .................. | 336/200 |
| 2011/0102969 | A1 * | 5/2011 | Togashi ..................... | 361/306.3 |

FOREIGN PATENT DOCUMENTS

| | | | |
|---|---|---|---|
| JP | 2000252159 | A * | 9/2000 |
| JP | 2001-185441 | A | 7/2001 |
| JP | 2003007566 | A * | 1/2003 |
| JP | 2004-140183 | A | 5/2004 |

* cited by examiner

*Primary Examiner* — David M Sinclair
(74) *Attorney, Agent, or Firm* — Keating & Bennett, LLP

(57) ABSTRACT

In an electronic component and a substrate module, a laminated body includes a first capacitor conductor and a second capacitor conductor embedded therein, which define a capacitor. First and second external electrodes are connected to the first capacitor conductor and the second capacitor conductor through extraction conductors, respectively. Third and fourth external electrodes are connected to the first capacitor conductor through extraction conductors. Fifth and sixth external electrodes are connected to the second capacitor conductor through extraction conductors. On a first side surface, no external electrode having an electrical potential different from the electrical potential of the third external electrode is provided between a first end surface and the third external electrode. On the first side surface, no external electrode having an electrical potential different from the electrical potential of the fifth external electrode is provided between a second end surface and the fifth external electrode.

6 Claims, 18 Drawing Sheets

ELECTRONIC COMPONENT AND SUBSTRATE MODULE INCLUDING AN EMBEDDED CAPACITOR

BACKGROUND OF THE INVENTION

1. Field of the Invention

The present invention relates to an electronic component and a substrate module, and more specifically, to an electronic component and a substrate module each of which includes a capacitor embedded therein.

2. Description of the Related Art

For example, as an electronic component of the related art, a known multilayer capacitor is described in Japanese Unexamined Patent Application Publication No. 2004-140183. FIG. 18 is the front view of a multilayer capacitor 500 described in Japanese Unexamined Patent Application Publication No. 2004-140183.

The multilayer capacitor 500 includes a laminated body 502, internal conductors 504 and 506, extraction electrodes 508 and 510, and external electrodes 512 and 514. The laminated body 502 is configured by laminating a plurality of dielectric layers. In FIG. 18, a surface on the underside of the laminated body 502 is a mounting surface. The internal conductors 504 and 506 are laminated along with a dielectric layer, and face each other across the dielectric layer, thereby forming electrostatic capacity. The extraction electrodes 508 and 510 are connected to the internal conductors 504 and 506, respectively, and are extracted to the mounting surface. The external electrodes 512 and 514 are connected to the extraction electrodes 508 and 510, respectively. In the multilayer capacitor 500 described above, by maintaining a distance between the extraction electrodes 508 and 510 and a distance from the internal conductors 504 and 506 to the mounting surface in a predetermined relationship, a reduction of the equivalent series inductance is achieved.

However, in the multilayer capacitor 500 described in Japanese Unexamined Patent Application Publication No. 2004-140183, since the external electrodes 512 and 514 are adjacent to each other, the external electrode 512 and the external electrode 514 may be connected to each other by solder when the multilayer capacitor 500 is mounted on a circuit substrate. Namely, in the multilayer capacitor 500, a short circuit may occur.

SUMMARY OF THE INVENTION

To overcome the problems described above, preferred embodiments of the present invention provide an electronic component and a substrate module in which low ESL properties are achieved while a short circuit is prevented from occurring when the electronic component and the substrate module are mounted on a circuit substrate.

An electronic component according to a preferred embodiment of the present invention preferably includes a substantially rectangular parallelepiped-shaped laminated body in which a plurality of dielectric layers are laminated, a first capacitor conductor provided on a dielectric layer, a first extraction conductor connected to the first capacitor conductor and extending to a first end surface of the laminated body, a third extraction conductor connected to the first capacitor conductor and extending to a first side surface of the laminated body, a second capacitor conductor provided on the dielectric layer and facing the first capacitor conductor across the dielectric layer, a second extraction conductor connected to the second capacitor conductor and extending to a second end surface of the laminated body, a fourth extraction conductor connected to the second capacitor conductor and extending to the first side surface, a first external electrode and a second external electrode arranged so as to extend to the first end surface and the second end surface, respectively, and to a bottom surface of the laminated body and connected to the first extraction conductor and the second extraction conductor, respectively, a third external electrode provided on the first side surface and connected to the third extraction conductor, and a fourth external electrode provided on the first side surface and connected to the fourth extraction conductor, wherein no external electrode maintained at an electrical potential different from an electrical potential of the third external electrode is provided between the first end surface and the third external electrode, on the first side surface, and no external electrode maintained at an electrical potential different from an electrical potential of the fourth external electrode is provided between the second end surface and the fourth external electrode, on the first side surface.

A substrate module according to a preferred embodiment of the present invention preferably includes a circuit substrate including a first land and a second land, and the electronic component to be mounted in the circuit substrate, wherein the first external electrode is connected to the first land, and the second external electrode is connected to the second land.

According to various preferred embodiments of the present invention, low ESL properties of an electronic component and a substrate module are achieved and a short circuit is prevented from occurring when the electronic component and the substrate module are mounted on a circuit substrate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, electronic components and substrate modules according to preferred embodiments of the present invention will be described with reference to drawings.

First Preferred Embodiment

Figure 1:
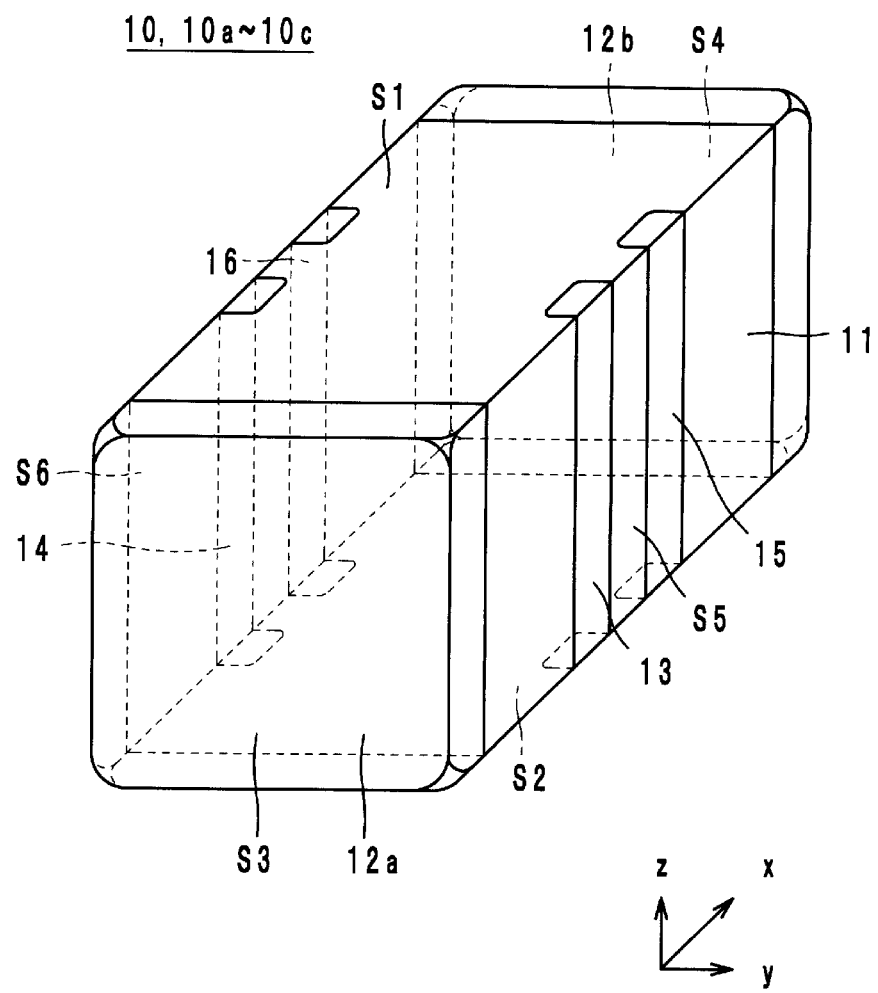
FIG. 1 is an external perspective view of an electronic component according to a first preferred embodiment of the present invention.
Figure 2:
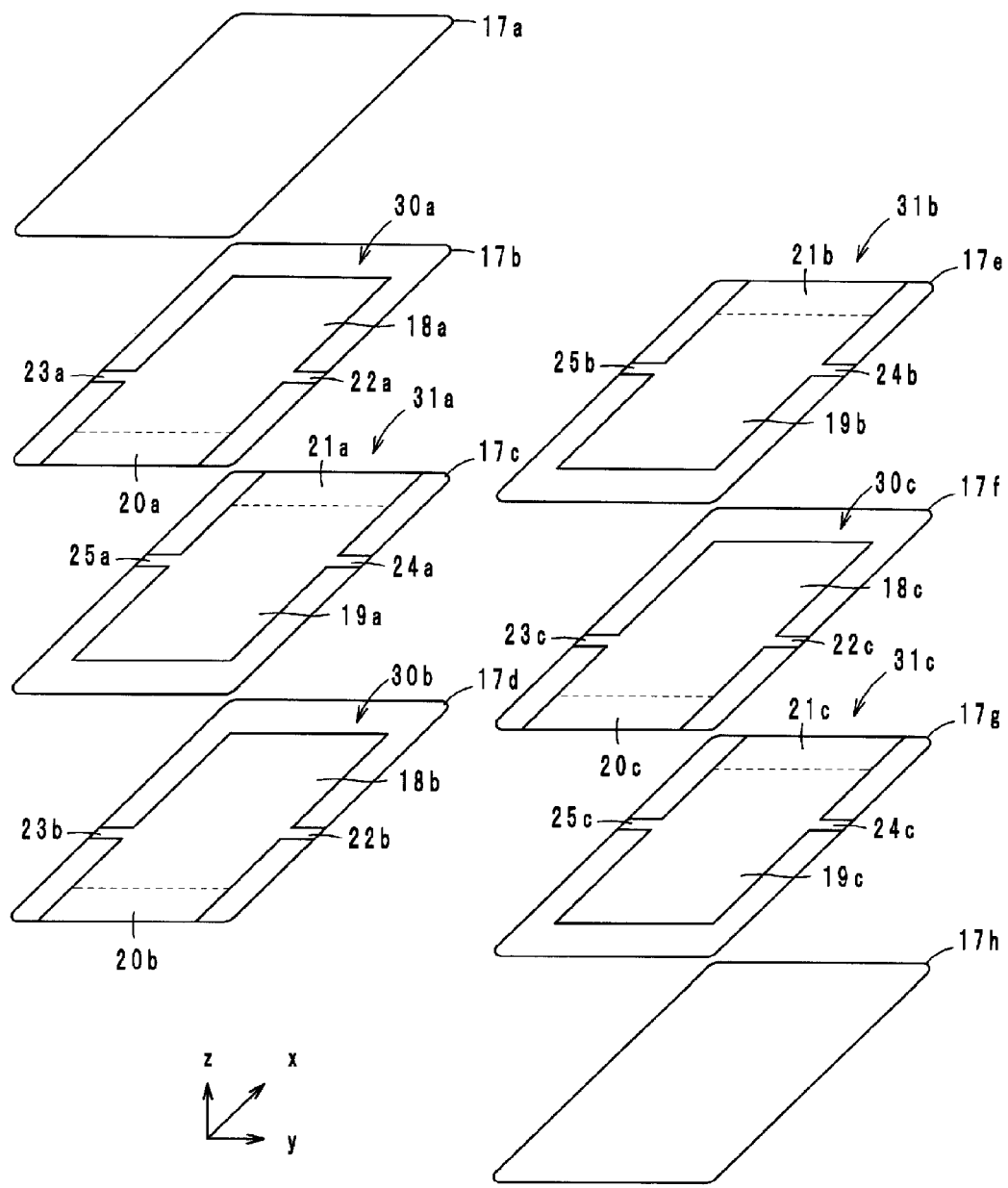
FIG. 2 is an exploded perspective view of a laminated body of the electronic component in FIG. 1.
Figure 3A:
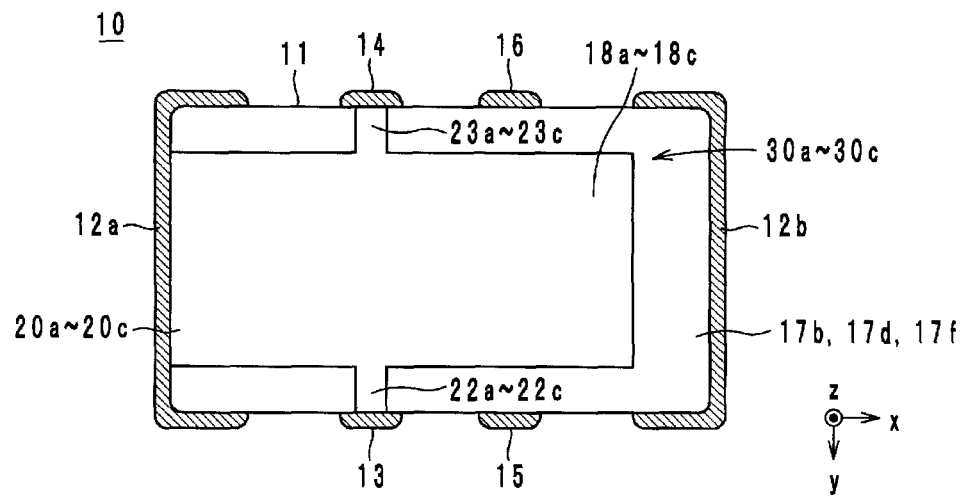
FIGS. 3A and 3B are internal plan views of the electronic component in FIG. 1.
Figure 3B:
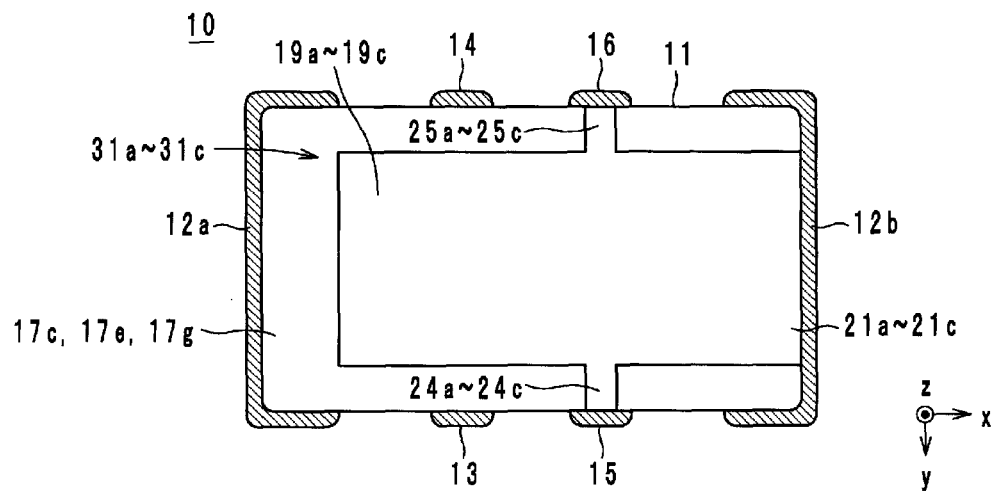

First, the configuration of an electronic component according to a first preferred embodiment of the present invention will be described with reference to drawings. FIG. 1 is an external perspective view of an electronic component 10 according to the first preferred embodiment. FIG. 2 is the exploded perspective view of a laminated body 11 of the electronic component 10 in FIG. 1. FIGS. 3A and 3B are the internal plan views of the electronic component in FIG. 1. Hereinafter, the lamination direction of the laminated body 11 is defined as a z-axis direction. When the plan view of the laminated body 11 is viewed from the z-axis direction, a direction in which the long side of the laminated body 11 extends is defined as an x-axis direction. When the plan view of the laminated body 11 is viewed from the z-axis direction, a direction in which the short side of the laminated body 11 extends is defined as a y-axis direction.

For example, the electronic component 10 is preferably a chip capacitor used as a coupling capacitor, and, as illustrated in FIG. 1 to FIG. 3B, includes the laminated body 11, external electrodes 12 (12a, 12b) and 13 to 16, and internal conductors 30 (30a to 30c) and 31 (31a to 31c) (not illustrated in FIG. 1).

The laminated body 11 preferably has a substantially rectangular parallelepiped shape, for example. However, the laminated body 11 is preferably chamfered, and thus substantially has a shape in which the corners and the ridge lines thereof are rounded. Hereinafter, in the laminated body 11, a surface on a positive direction side in the z-axis direction is referred to as a top surface S1 and a surface on a negative direction side in the z-axis direction is a bottom surface S2. In addition, a surface on a negative direction side in the x-axis direction is referred to as an end surface S3 and a surface on a positive direction side in the x-axis direction is referred to as an end surface S4. In addition, a surface on a positive direction side in the y-axis direction is it is assumed that a side surface S5 and a surface on a negative direction side in the y-axis direction is it is assumed that a side surface S6.

As illustrated in FIG. 2, a plurality of ceramic layers 17 (17a to 17h) are laminated from the positive direction side to the negative direction side in the z-axis direction so as to be arranged in this order, and thus the laminated body 11 is configured. The ceramic layer 17 preferably has a substantially rectangle shape, for example, and is manufactured using dielectric ceramic. Hereinafter, a main surface on the positive direction side in the z-axis direction of the ceramic layer 17 is referred to as a front surface and a main surface on the negative direction side in the z-axis direction of the ceramic layer 17 is referred to as a back surface.

The top surface S1 of the laminated body 11 is defined by the front surface of the ceramic layer 17a provided on the farthest positive direction side in the z-axis direction. The bottom surface S2 of the laminated body 11 is defined by the back surface of the ceramic layer 17h provided on the farthest negative direction side in the z-axis direction. In addition, the short sides of the ceramic layers 17a to 17h on the negative direction side in the x-axis direction are aligned or substantially aligned, and thus the end surface S3 is configured. The short sides of the ceramic layers 17a to 17h on the positive direction side in the x-axis direction are aligned or substantially aligned, and thus the end surface S4 is configured. The long sides of the ceramic layers 17a to 17h on the positive direction side in the y-axis direction are lined, and hence the side surface S5 is configured. The long sides of the ceramic layers 17a to 17h on the negative direction side in the y-axis direction are aligned or substantially aligned, and thus the side surface S6 is configured.

As illustrated in FIG. 2 and FIGS. 3A and 3B, the internal conductors 30a to 30c are provided on the front surfaces of the ceramic layers 17b, 17d, and 17f, respectively, and are embedded in the laminated body 11. The internal conductors 31a to 31c are provided on the front surfaces of the ceramic layers 17c, 17e, and 17g, respectively, and are embedded in the laminated body 11. Particularly, the internal conductor 30 and the internal conductor 31 are alternately laminated in the z-axis direction.

The internal conductor 30 (30a to 30c) preferably includes a capacitor conductor 18 (18a to 18c) and extraction conductors 20 (20a to 20c), 22 (22a to 22c), and 23 (23a to 23c). The capacitor conductor 18 preferably has a substantially rectangle shape, for example, and is provided on the front surface of the ceramic layer 17 so as not to be in contact with the outer edge of the ceramic layer 17.

The extraction conductor 20 is connected to the capacitor conductor 18 and extends to the end surface S3 of the laminated body 11, thereby being exposed from the end surface S3. More specifically, the extraction conductor 20 extends from the short side on the negative direction side in the x-axis direction of the capacitor conductor 18 toward the negative direction side in the x-axis direction. Accordingly, the extraction conductor 20 extends to the short side on the negative direction side in the x-axis direction of the ceramic layer 17.

The extraction conductor 22 is connected to the capacitor conductor 18 and extends to the side surface S5 of the laminated body 11, thereby being exposed from the side surface S5. More specifically, the extraction conductor 22 extends from a position, located on the negative direction side in the x-axis direction from the midpoint of the long side on the positive direction side in the y-axis direction of the capacitor conductor 18, toward the positive direction side in the y-axis direction. Accordingly, the extraction conductor 22 extends to a position, located on the negative direction side in the x-axis direction from the midpoint of the long side on the positive direction side in the y-axis direction of the ceramic layer 17.

The extraction conductor 23 is connected to the capacitor conductor 18 and extends to the side surface S6 of the laminated body 11, thereby being exposed from the side surface S6. More specifically, the extraction conductor 23 extends from a position, located on the negative direction side in the x-axis direction from the midpoint of the long side on the negative direction side in the y-axis direction of the capacitor conductor 18, toward the negative direction side in the y-axis direction. Accordingly, the extraction conductor 23 extends to a position, located on the negative direction side in the x-axis direction from the midpoint of the long side on the negative direction side in the y-axis direction of the ceramic layer 17.

The internal conductor 31 (31a to 31c) includes a capacitor conductor 19 (19a to 19c) and extraction conductors 21 (21a to 21c), 24 (24a to 24c), and 25 (25a to 25c). The capacitor conductor 19 preferably has a substantially rectangle shape, for example, and is provided on the front surface of the ceramic layer 17 so as not to be in contact with the outer edge of the ceramic layer 17. In addition, the capacitor conductor 19 faces the capacitor conductor 18 across the ceramic layer 17. Accordingly, electrostatic capacity, i.e., a capacitor, is provided between the capacitor conductors 18 and 19.

The extraction conductor 21 is connected to the capacitor conductor 19 and extends to the end surface S4 of the laminated body 11, thereby being exposed from the end surface S4. More specifically, the extraction conductor 21 extends from the short side on the positive direction side in the x-axis direction of the capacitor conductor 19 toward the positive direction side in the x-axis direction. Accordingly, the extraction conductor 21 extends to the short side on the positive direction side in the x-axis direction of the ceramic layer 17.

The extraction conductor 24 is connected to the capacitor conductor 19 and extends to the side surface S5 of the laminated body 11, thereby being exposed from the side surface S5. More specifically, the extraction conductor 24 extends from a position, located on the positive direction side in the x-axis direction from the midpoint of the long side on the positive direction side in the y-axis direction of the capacitor conductor 19, toward the positive direction side in the y-axis direction. Accordingly, the extraction conductor 24 extends to a position, located on the positive direction side in the x-axis direction from the midpoint of the long side on the positive direction side in the y-axis direction of the ceramic layer 17. Compared with the extraction conductor 22, the extraction conductor 24 is located on the positive direction side in the x-axis direction when the plan view of the extraction conductor 24 is viewed from the z-axis direction.

The extraction conductor 25 is connected to the capacitor conductor 19 and extends to the side surface S6 of the laminated body 11, thereby being exposed from the side surface S6. More specifically, the extraction conductor 25 extends from a position, located on the positive direction side in the x-axis direction from the midpoint of the long side on the negative direction side in the y-axis direction of the capacitor conductor 19, toward the negative direction side in the y-axis direction. Accordingly, the extraction conductor 25 extends to a position, located on the positive direction side in the x-axis direction from the midpoint of the long side on the negative direction side in the y-axis direction of the ceramic layer 17. Compared with the extraction conductor 23, the extraction conductor 25 is located on the positive direction side in the x-axis direction when the plan view of the extraction conductor 25 is viewed from the z-axis direction.

The external electrodes 12a and 12b are arranged so as to extend to the end surfaces S3 and S4, respectively, and to the top surface S1, the bottom surface S2, and the side surfaces S5 and S6 of the laminated body 11, and are connected to the extraction conductors 20a to 20c and the extraction conductors 21a to 21c, respectively. More specifically, the external electrode 12a preferably substantially covers the whole surface of the end surface S3 of the laminated body 11 so as to cover a portion at which the extraction conductors 20a to 20c are exposed from the end surface S3. Furthermore, the external electrode 12a is arranged to extend from the end surface S3 to the top surface S1, the bottom surface S2, and the side surfaces S5 and S6. The external electrode 12b preferably substantially covers the entire surface of the end surface S4 of the laminated body 11 so as to cover a portion at which the extraction conductors 21a to 21c are exposed from the end surface S4. Furthermore, the external electrode 12b is arranged to extend from the end surface S4 to the top surface S1, the bottom surface S2, and the side surfaces S5 and S6.

The external electrodes 13 and 14 are provided on the side surfaces S5 and S6, respectively, and connected to the extraction conductors 22a to 22c and the extraction conductors 23a to 23c, respectively. More specifically, the external electrode 13 preferably has a substantially band shape extending in the z-axis direction on the side surface S5 of the laminated body 11 so as to cover a portion at which the extraction conductors 22a to 22c are exposed from the side surface S5. Furthermore, the external electrode 13 is arranged to extend from the side surface S5 to the top surface S1 and the bottom surface S2. The external electrode 14 preferably has a substantially band shape extending in the z-axis direction on the side surface S6 of the laminated body 11 so as to cover a portion at which the extraction conductors 23a to 23c are exposed from the side surface S6. The external electrode 14 faces the external electrode 13. Furthermore, the external electrode 14 is arranged to extend from the side surface S6 to the top surface S1 and the bottom surface S2.

The external electrodes 15 and 16 are provided on the side surfaces S5 and S6, respectively, and connected to the extraction conductors 24a to 24c and the extraction conductors 25a to 25c, respectively. More specifically, the external electrode 15 preferably has a substantially band shape extending in the z-axis direction on the side surface S5 of the laminated body 11 so as to cover a portion where the extraction conductors 24a to 24c are exposed from the side surface S5. Furthermore, the external electrode 15 is arranged to extend from the side surface S5 to the top surface S1 and the bottom surface S2. In addition, since, as compared to the extraction conductor 22, the extraction conductor 24 is located on the positive direction side in the x-axis direction, the external electrode 15 is located on the positive direction side in the x-axis direction as compared to the external electrode 13. The external electrode 16 preferably has a substantially band shape extending in the z-axis direction on the side surface S6 of the laminated body 11 so as to cover a portion at which the extraction conductors 25a to 25c are exposed from the side surface S6. The external electrode 16 faces the external electrode 15. Furthermore, the external electrode 16 is arranged to extend from the side surface S6 to the top surface S1 and the bottom surface S2. In addition, since, as compared to the extraction conductor 23, the extraction conductor 25 is located on the positive direction side in the x-axis direction, the external electrode 16 is located on the positive direction side in the x-axis direction compared with the external electrode 14.

In addition, as illustrated in FIG. 1, in the electronic component 10, preferably, no external electrodes that have electrical potentials different from those of the external electrodes 13 and 14 are provided between the end surface S3 and the external electrodes 13 and 14 on the side surfaces S5 and S6, respectively. In addition, as illustrated in FIG. 1, the external electrode 12a is arranged to extend from the end surface S3 to the side surfaces S5 and S6. Therefore, the external electrode 12a is individually provided between the end surface S3 and the external electrodes 13 and 14. However, the external electrode 12a is individually electrically connected to the external electrodes 13 and 14 through the internal conductor 30. Therefore, the electrical potential of the external electrode 12a is equal to the electrical potentials of the external electrodes 13 and 14.

In addition, as illustrated in FIG. 1, in the electronic component 10, no external electrodes having electrical potentials different from those of the external electrodes 15 and are provided between the end surface S4 and the external electrodes 15 and 16 on the side surfaces S5 and S6, respectively. In addition, as illustrated in FIG. 1, the external electrode 12b is arranged to extend from the end surface S4 to the side surfaces S5 and S6. Therefore, the external electrode 12b is individually provided between the end surface S4 and the external electrodes 15 and 16. However, the external electrode 12b is individually electrically connected to the external electrodes 15 and 16 through the internal conductor 31. Therefore, the electrical potential of the external electrode 12b is equal to the electrical potentials of the external electrodes 15 and 16.

Furthermore, no external electrode having an electrical potential different from those of the external electrodes 13 and 15 is provided between the external electrode 13 and the external electrode 15 on the side surface S5. In the same manner, no external electrode having an electrical potential different from those of the external electrodes 14 and 16 is provided between the external electrode 14 and the external electrode 16 on the side surface S6. Particularly, no external electrode is provided between the external electrodes 13 and 15 and between the external electrodes 14 and 16. Accordingly, the external electrodes 13 and 15 are adjacent to each other, and the external electrodes 14 and 16 are adjacent to each other.

Next, a manufacturing method for the electronic component 10 will be described.

First, $BaTiO_3$, $CaTiO_3$, $SrTiO_3$, or $CaZrO_3$ as a main component and Mn compound, Fe compound, Cr compound, Co compound, Ni compound, or rare earth compound as an accessory component, for example, are weighed with a predetermined ratio and put in a ball mill and wet blended. After the blended material is dried and ground to form a powder, and the powder is calcined. After the calcined powder has been wet-ground using a ball mill, the calcined powder is dried and then cracked, thereby obtaining dielectric ceramic powder.

Organic binder and organic solvent are added to this dielectric ceramic powder to be mixed using a ball mill to form a ceramic slurry. The ceramic slurry is formed in a substantially sheet shape on a carrier sheet by a doctor blade method, for example, and dried, and a ceramic green sheet to be the ceramic layer 17 is manufactured. It is preferable that the thickness of the ceramic green sheet to be the ceramic layer 17 is in the range of about 0.5 µm to about 10 µm, for example.

Next, by applying paste including conductive material on the ceramic green sheet to be the ceramic layer 17 by a method such as a screen printing method, a photolithographic method, or other suitable method, for example, the internal conductors 30 and 31 are formed. For example, the paste including conductive material is obtained by adding organic binder and organic solvent to metal powder. For example, the metal powder is Ni, Cu, Ag, Pd, Ag—Pd alloy, Au, or other suitable metal powder. It is preferable that the thicknesses of the internal conductors 30 and 31 are in the range of about 0.3 µm to about 2.0 µm, for example.

Next, by laminating the ceramic green sheet to be the ceramic layer 17, an unfired mother laminated body is obtained. Thereafter, the unfired mother laminated body is subjected to pressure bonding using an isostatic press, for example.

Next, the unfired mother laminated body is cut to a predetermined size, and a plurality of unfired laminated bodies 11 are obtained. After that, the front surface of the laminated body 11 is subjected to a polishing process, such as barrel polishing or other suitable polishing process, for example.

Next, the unfired laminated body 11 is fired. For example, it is preferable that a firing temperature is in the range of about 900° C. to about 1300° C. According to the process described above, the preparation of the laminated body 11 is completed.

Next, the external electrodes 12 to 16 are formed on the laminated body 11. Specifically, conductive paste is applied to the front surface of the laminated body 11 by a dip method or a slit method of the related art or other suitable method, for example. In addition, by baking the conductive paste at a temperature in the range of about 700° C. to about 900° C., the underlying electrodes of the external electrodes 12 to 16 are formed. For example, as the material of the conductive paste, Cu, Ni, Ag, Pd, Ag—Pd alloy, Au, or other suitable material may be used. It is preferable that the thickness of the underlying electrode is in the range of about 10 µm to about 50 µm. Next, plating is applied on the underlying electrodes, and the external electrodes 12 to 16 are completed. For example, as the material of a plated layer, Cu, Ni, Ag, Pd, Ag—Pd alloy, Au, or other suitable material may be used. In addition, by performing plating more than once, a plurality of plated layers may be formed on the underlying electrode. According to the process described above, the preparation of the electronic component 10 is completed.

Figure 4A:
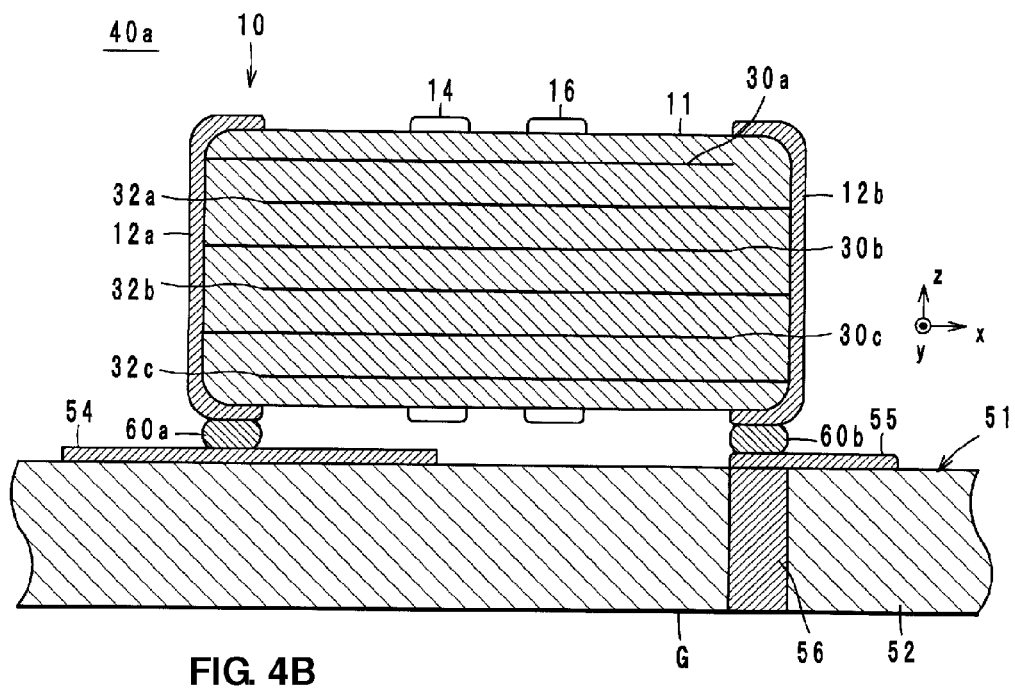
FIG. 4A is a cross-section structure diagram of a substrate module and FIG. 4B is a diagram when the plan view of the substrate module is viewed from a positive direction side in a z-axis direction.
Figure 4B:
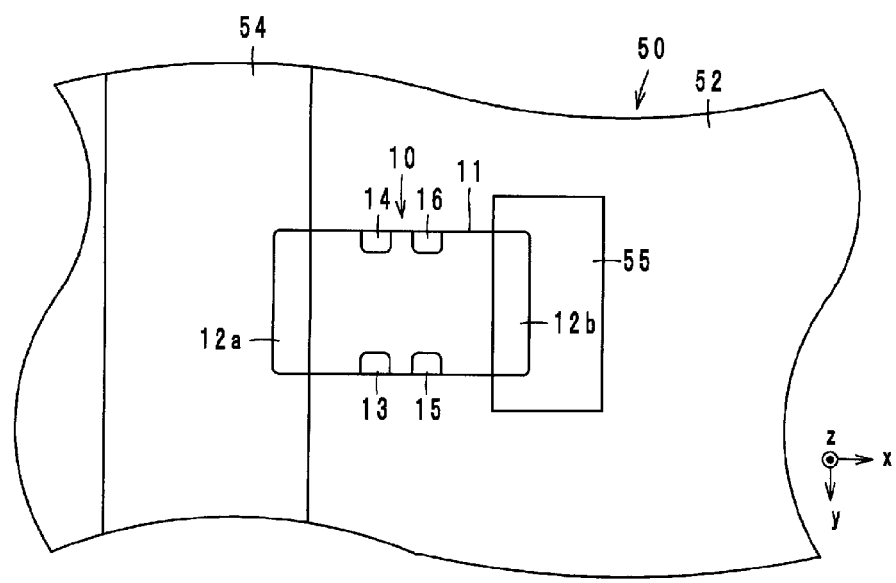
Figure 5:
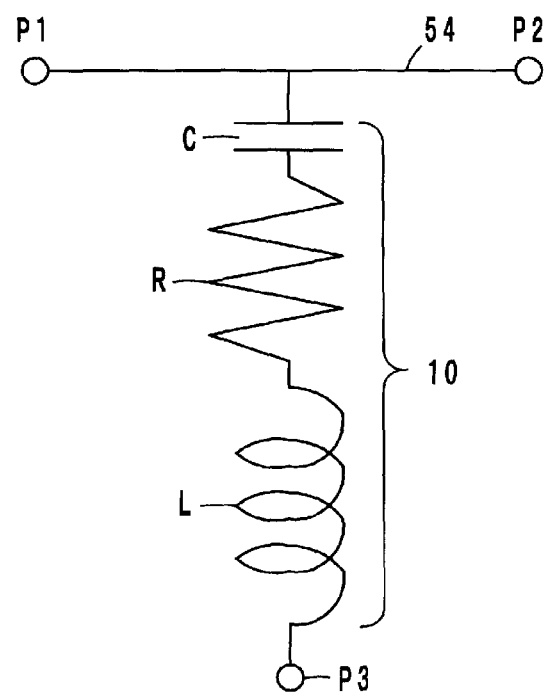
FIG. 5 is an equivalent circuit diagram of the substrate module in FIGS. 4A and 4B.

Next, a substrate module 40a including the electronic component 10 will be described with reference to drawings. FIG. 4A is the cross-sectional structural view of the substrate module 40a and FIG. 4B is a plan view of the substrate module 40a viewed from a positive direction side in a z-axis direction. FIG. 5 is the equivalent circuit diagram of the substrate module 40a in FIGS. 4A and 4B.

As illustrated in FIG. 4A, the substrate module 40a includes the electronic component 10 and a circuit substrate 51. The circuit substrate 51 preferably includes a substrate main body 52, a signal conductor 54, a ground electrode 55, a via hole conductor 56, and a ground conductor G.

The substrate main body 52 is a laminated substrate in which a plurality of ceramic layers and a plurality of conductor layers are laminated, and includes electrical circuits on the main surface and inside the substrate main body. The signal conductor 54 is provided on a main surface in the positive direction side in the z-axis direction of the substrate main body 52, and extends in a y-axis direction as illustrated in FIG. 4B. An input port P1 (not illustrated) is provided on an end portion on a positive direction side in the y-axis direction of the signal conductor 54, and an output port P2 (not illustrated) is provided on an end portion on a negative direction side in the y-axis direction of the signal conductor 54. The ground electrode 55 is provided on a main surface in the positive direction side in the z-axis direction of the circuit substrate 51, and has a substantially rectangle shape as illustrated in FIG. 4B.

The ground conductor G is provided within the substrate main body 52, and is maintained at a ground potential. The ground conductor G is connected to a ground port P3 (not illustrated). The via hole conductor 56 is provided within the substrate main body 52, and connects the ground electrode 55 and the ground conductor G to each other. Accordingly, the ground electrode 55 is also maintained at the ground potential.

The electronic component 10 is mounted in the circuit substrate 51. More specifically, the external electrode 12a is connected to the signal conductor 54 by solder 60a. In addition, the external electrode 12b is connected to the ground electrode 55 by solder 60b. Accordingly, the substrate module 40a has a circuit configuration as illustrated in FIG. 5. Particularly, the signal conductor 54 connects the input port P1 and the output port P2 to each other. In addition, the electronic component 10 is provided between the signal conductor 54 and the ground port P3. In FIG. 5, a capacitor C, a resistance R, and a coil L indicate an electrostatic capacity, an electrical resistance, and an inductor included in the electronic component 10. The substrate module 40a is preferably configured as illustrated in FIG. 5, and thus a high-frequency signal is input from the input port P1 and output from the output port P2. Furthermore, a high-frequency signal corresponding to the resonance frequency of the electronic component 10, from among the high-frequency signal input from the input port P1, is not output from the output port P2 but is output from the ground port P3. In addition, the circuit configuration of the substrate module 40a is not limited to FIG. 5. Accordingly, in the substrate module 40a, the electronic component 10 may be provided between the input port P1 and the output port P2.

Figure 6:
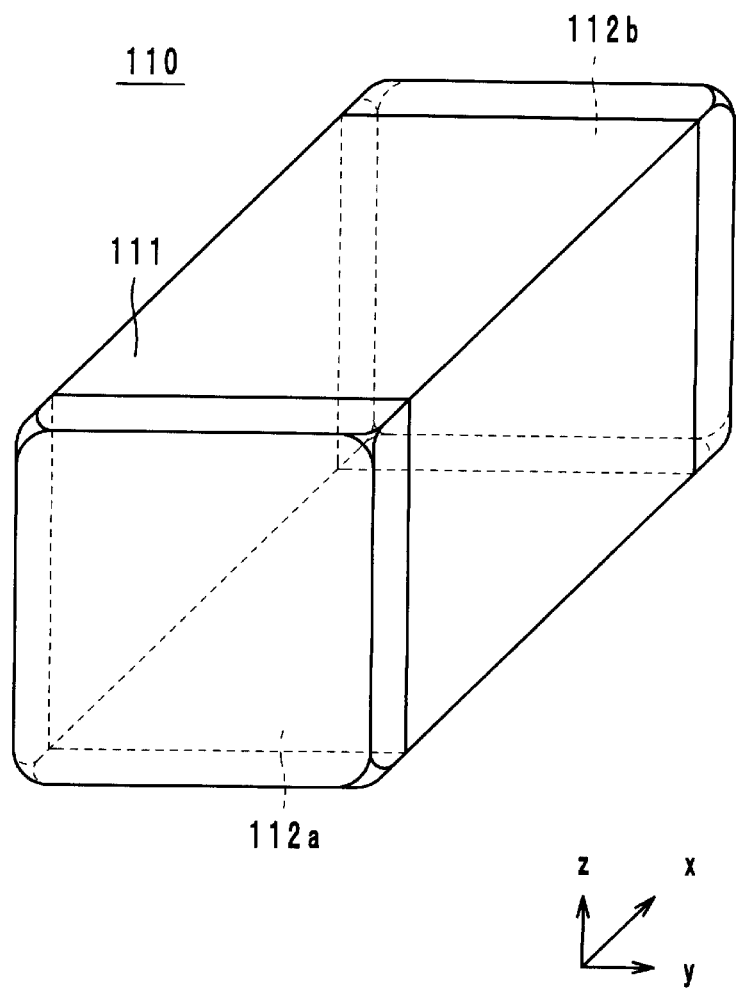
FIG. 6 is an external perspective view of an electronic component according to a comparative example.
Figure 7:
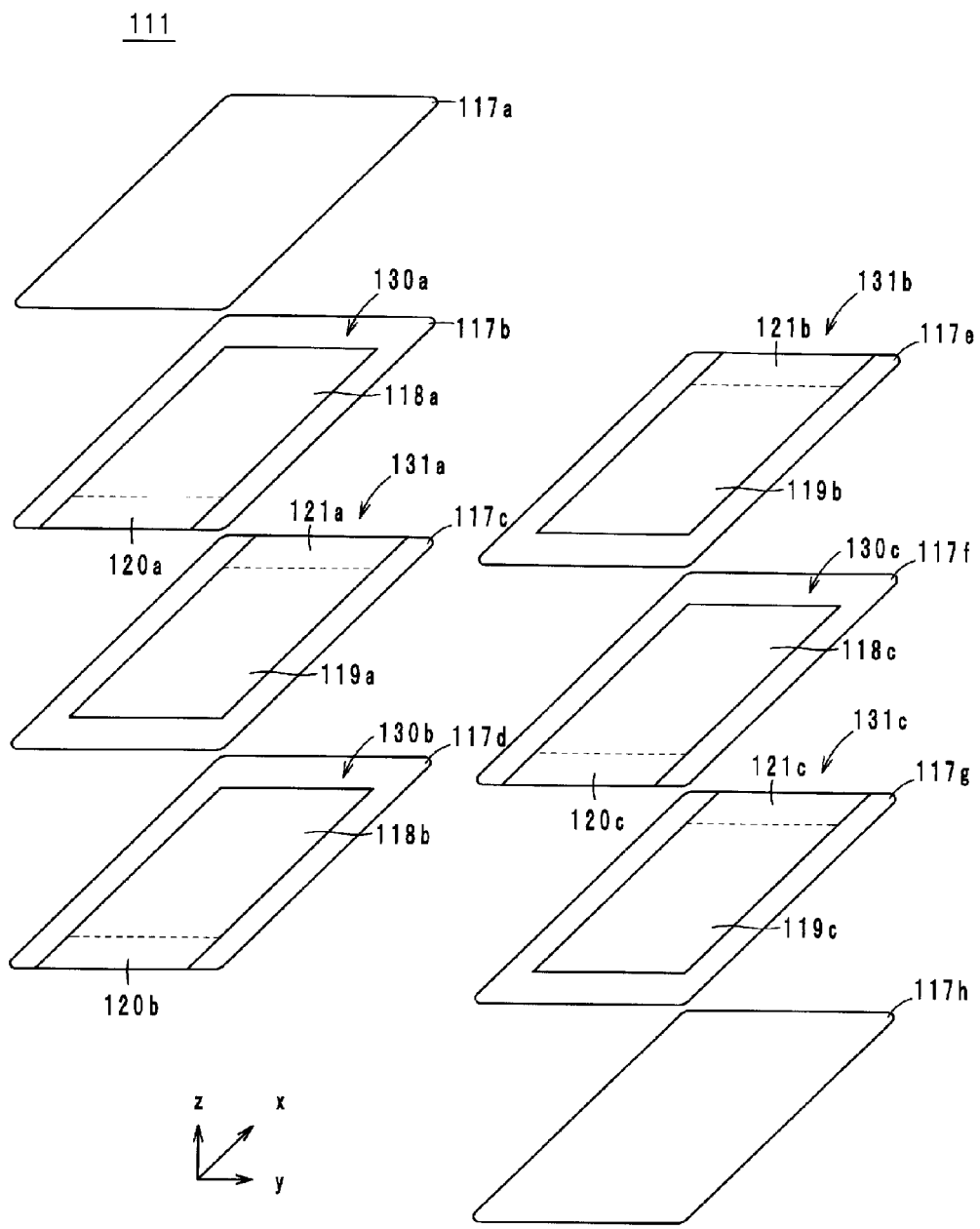
FIG. 7 is an exploded perspective view of a laminated body of the electronic component according to the comparative example.

According to the electronic component 10 and the substrate module 40a described above, a low ESL property is obtained as described below. FIG. 6 is the external perspective view of an electronic component 110 according to a comparative example. FIG. 7 is the exploded perspective view of a laminated body 111 of the electronic component 110 according to the comparative example. The electronic component 110 according to the comparative example is obtained by removing the extraction conductors 22 to 25 and the external electrodes 13 to 16 from the electronic component 10 according to the first preferred embodiment. Therefore, in the electronic component 110, a reference symbol obtained by adding "100" to the reference symbol in the electronic component 10 is assigned to the same elements as the electronic component 10.

In the electronic component 110 illustrated in FIG. 7, a laminated body 111 includes ceramic layers 117a to 117h. The internal conductors 130a to 130c are provided on the front surfaces of the ceramic layers 117b, 117d, and 117f, respectively, and are embedded in the laminated body 111. The internal conductors 131a to 131c are provided on the front surfaces of the ceramic layers 117c, 117e, and 117g, respectively, and are embedded in the laminated body 111. In a substrate module in which the electronic component 110 according to the comparative example is mounted, a high-frequency signal is input from the signal conductor into the electronic component 110 through the external electrode 112a, and output to the ground electrode through the external electrode 112b. At this time, the high-frequency signal flows through the signal conductor, the external electrode 112a, the extraction conductors 120a to 120c, the capacitor conductors 118a to 118c, the capacitor conductors 119a to 119c, the extraction conductors 121a to 121c, the external electrode 112b, and the ground electrode in this order. Particularly, in the substrate module in which the electronic component 110 according to the comparative example is mounted, the high-frequency signal only flows through one path. On the other hand, in the electronic component 10 according to the first preferred embodiment in the substrate module 40a, a high-frequency signal is input from the signal conductor 54 into the electronic component 10 through the external electrode 12a, and output to the ground electrode 55 through the external electrode 12b. At this time, the high-frequency signal flows through a first path and a second path as described below.

The first path is a path in which the high-frequency signal flows through the signal conductor 54, the external electrode 12a, the extraction conductor 20, the capacitor conductor 18, the capacitor conductor 19, the extraction conductor 21, the external electrode 12b, and the ground electrode 55 in this order. The second path is a path in which the high-frequency signal flows through the signal conductor 54, the external electrode 12a, the extraction conductor 20, the capacitor conductor 18, the extraction conductors 22 and 23, the external electrodes 13 and 14, the external electrodes 15 and 16, the extraction conductors 24 and 25, the capacitor conductors 19, the extraction conductor 21, the external electrode 12b, and the ground electrode 55 in this order. In the second path, when the high-frequency signal flows from the external electrodes 13 and 14 to the external electrodes 15 and 16, the high-frequency signal preferably passes through the inside of a dielectric between the external electrodes 13 and 14 and the external electrodes 15 and 16, and thus the high-frequency signal passes from the external electrodes 13 and 14 to the external electrodes 15 and 16.

As described above, in the substrate module 40a in which the electronic component 10 is mounted, the high-frequency signal preferably flows through the first path and the second path that are connected in parallel to each other. The first path in the electronic component 10 is the same or substantially the same as the path in the electronic component 110. Accordingly, the electronic component 10 is preferably configured such that the second path is added to the electronic component 110. In addition, the combined impedance value LT of the inductance value L1 of the first path and the inductance value L2 of the second path is indicated in the following expression (1).

$$LT = L1 \cdot L2/(L1+L2) \qquad (1)$$

The inductance value of the path in the electronic component 110 is L1. Accordingly, the combined impedance value LT of the first path and the second path in the electronic component 10 is less than the inductance value L1 of the path in the electronic component 110. Particularly, as compared to the electronic component 110, the low ESL property of the electronic component 10 is achieved.

In addition, in the electronic component 10, by achieving the low ESL property of the electronic component 10, the resonance frequency thereof is increased. As a result, the high-frequency characteristics of the electronic component 10 are improved.

In addition, it is preferable that no external electrode having an electrical potential different from the electrical potentials of the external electrodes 13 and 15 is provided between the external electrodes 13 and 15 on the side surface S5 so that the high-frequency signal flows from the external electrodes 13 and 14 to the external electrodes 15 and 16. In the same manner, it is preferable that no external electrode having an electrical potential different from the electrical potentials of the external electrodes 14 and 16 is provided between the external electrodes 14 and 16 on the side surface S6.

In addition, it is preferable that a distance between the external electrodes 13 and 14 and a distance between the external electrodes 15 and 16 are as small as possible, for example, in the range of about 50 μm to about 200 μm, so that the high-frequency signal flows from the external electrodes 13 and 14 to the external electrodes 15 and 16.

In addition, in the electronic component 10, a short circuit is prevented from occurring when the electronic component 10 is mounted on the circuit substrate 51. More specifically, in the multilayer capacitor 500 described in Japanese Unexamined Patent Application Publication No. 2004-140183, since the external electrodes 512 and 514 are adjacent to each other, the external electrode 512 and the external electrode 514 may be connected to each other by solder when the multilayer capacitor 500 is mounted on a circuit substrate. That is, in the multilayer capacitor 500, a short circuit may occur.

On the other hand, as compared to the external electrodes 512 and 514 in the multilayer capacitor 500 described in Japanese Unexamined Patent Application Publication No. 2004-140183, the external electrodes 12a and 12b are not adjacent to each other in the electronic component 10. Instead, the external electrode 13 and the external electrode 15 are adjacent to each other. In the same manner, the external electrode 14 and the external electrode 16 are adjacent to each other. However, the external electrodes 13 to 16 are not solder-mounted in the circuit substrate 51. Therefore, it is unlikely that the external electrode 13 and the external electrode 15 are solder-connected to each other and the external electrode 14 and the external electrode 16 is solder-connected to each other. Accordingly, in the electronic component 10, a short circuit is prevented from occurring when the electronic component 10 is mounted on the circuit substrate 51.

In addition, in the electronic component 10, it is less likely that a loss occurs in the high-frequency signal flowing through the electronic component 10. More specifically, in the electronic component 10, it is necessary for the high-frequency signal to flow toward the positive direction side in the x-axis direction. Here, in the electronic component 10, when external electrodes having electrical potentials different from those of the external electrodes 13 and 14 are provided between the end surface S3 and the external electrodes 13 and 14 on the side surfaces S5 and S6, the high-frequency signals flow from the external electrodes 13 and 14 toward the external electrodes (that is, towards the negative direction side in the x-axis direction). Particularly, the high-frequency signals flow in a direction opposite to a direction in which the high-frequency signals are to flow, and thus a loss occurs. Therefore, as illustrated in FIG. 1, in the electronic component 10, no external electrodes having electrical potentials different from those of the external electrodes 13 and 14 are provided between the end surface S3 and the external electrodes 13 and 14 on the side surfaces S5 and S6, respectively. Accordingly, the loss is prevented from occurring. In addition, for the same or substantially the same reason, no external electrodes having electrical potentials different from those of the external electrodes 15 and 16 are provided between the end surface S4 and the external electrodes 15 and 16 on the side surfaces S5 and S6, respectively.

In the electronic component 10, it is possible to prevent delamination from occurring. More specifically, in an electronic component, delamination is more likely to occur at the corner of a laminated body. When an extraction electrode and a ceramic layer are laminated at the corner, delamination is more likely to occur between the extraction electrode and the ceramic layer. Therefore, in the electronic component 10, the extraction conductors 20 and 21 preferably do not extend to the corner of the laminated body 11. Accordingly, in the electronic component 10, delamination is prevented from occurring. Furthermore, in the electronic component 10, since the extraction electrodes 20 and 21 are not exposed at the corner of the laminated body 11, the moisture resistance of the electronic component 10 is improved.

In order to clarify the advantageous effects obtained by the electronic component 10 and the substrate module 40a, the inventors of the present invention performed a first experiment described below. Specifically, a sample (hereinafter, the first sample) of the substrate module 40a illustrated in FIGS. 4A and 4B and a sample (second sample) of a substrate module in which the electronic component 110 illustrated in FIG. 6 and FIG. 7 is mounted in the circuit substrate 51 in FIGS. 4A and 4B were manufactured. In addition, using a network analyzer (Agilent 8722D), the ESLs and the transmission characteristics (S21) of the first sample and the second sample were measured. First, the parameters of the first sample and the second sample will be described.

Dimension: about 2.096 mm×about 1.290 mm×about 0.793 mm

Electrostatic capacity: about 14 pF

Material of an internal conductor and an external electrode: Cu

The relative dielectric constant ($\in$) of a ceramic layer: about 27

The number of internal conductors: about 6

An element thickness (a distance between the internal conductors 30 and 31): about 122 μm Outer layer thickness (a distance from the internal conductors 30a and 31c to the top surface S1 or bottom surface S2 of the laminated body 11): about 88 μm In the first sample and the second sample with the above-described parameters, the ESLs thereof are as follows. In addition, the ESLs were measured in a frequency bandwidth of about 0.5 GHz to about 20 GHz.

The ESL of the first sample: about 465 pH

The ESL of the second sample: about 500 pH

Accordingly, based on the first experiment, it is understood that, in the substrate module 40a including the electronic component 10, a reduced ESL property is achieved as compared to the circuit module including the electronic component 110.

Figure 8:
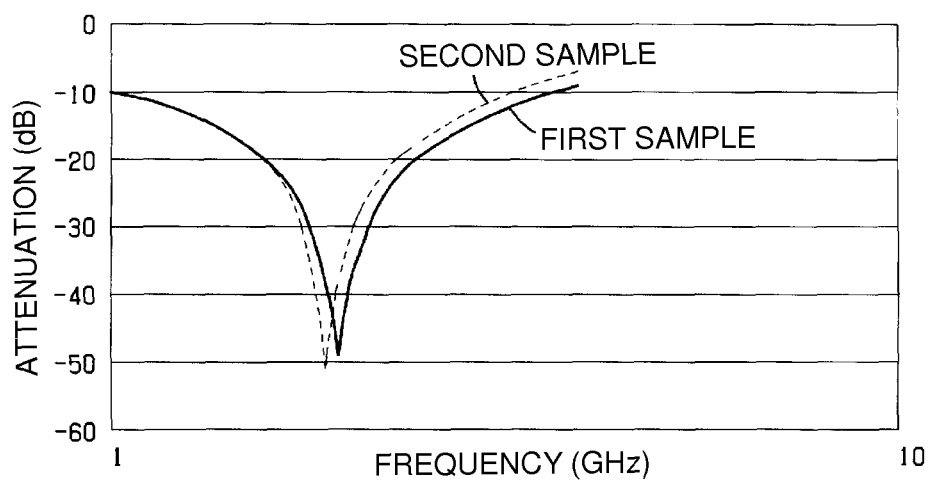
FIG. 8 is a graph illustrating transmission characteristics (S21) of a first sample and a second sample.

FIG. 8 is a graph illustrating the transmission characteristics (S21) of the first sample and the second sample. A vertical axis indicates attenuation, and a horizontal axis indicates a frequency.

According to FIG. 8, it is understood that the self-resonance frequency f1 of the first sample is greater than the self-resonance frequency f2 of the second sample. Specifically, the self-resonance frequency f1 is about 1.975 GHz, and the self-resonance frequency f2 is about 1.905 GHz. Accordingly, based on the experimental result in FIG. 8, it is understood that the high-frequency characteristic of the substrate module 40a is superior to the high-frequency characteristic of the circuit module including the electronic component 110.

First Modification

Figure 9:
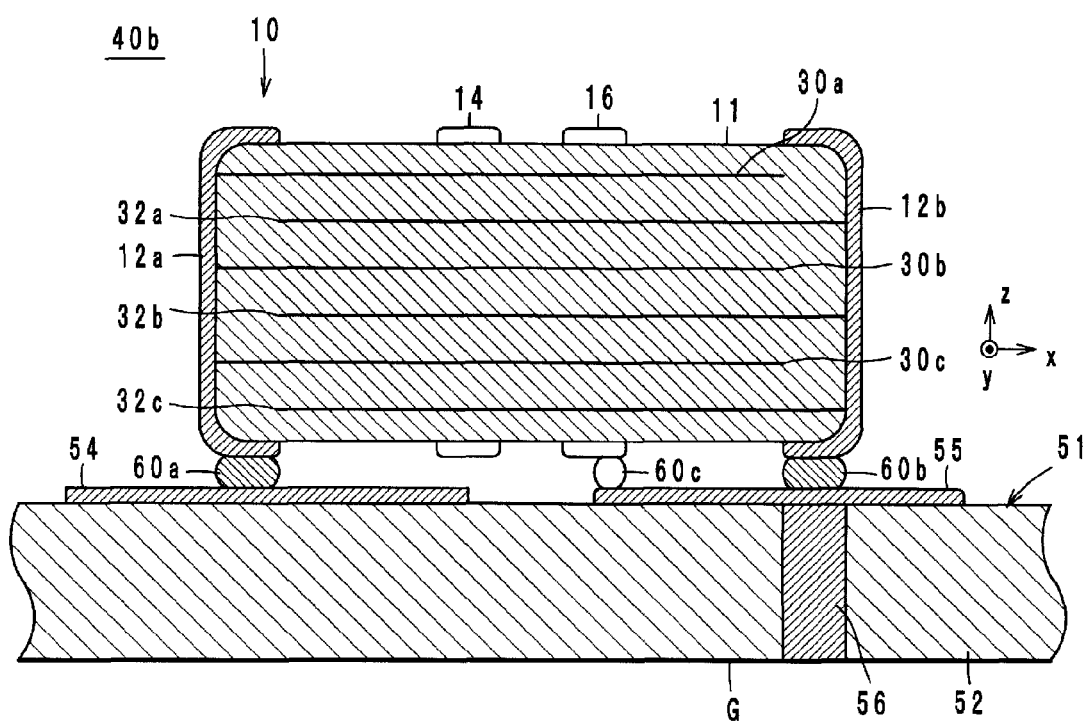
FIG. 9 is a cross-section structure diagram of a substrate module.

Next, a substrate module according to a first modification of the first preferred embodiment of the present invention will be described with reference to the drawings. FIG. 9 is the cross-section structure diagram of a substrate module 40b.

The substrate module 40b differs from the substrate module 40a in that the external electrodes 15 and 16 are preferably connected to the ground electrode 55 by solder 60c. Since no other differences exist between the substrate module 40b and the substrate module 40a, further description of the configuration of the substrate module 40b is omitted.

In the substrate module 40a, the high-frequency signals flow through the first path and the second path. On the other hand, in the substrate module 40b, the high-frequency signals preferably flow through a third path and a fourth path described below, in addition to the first path and the second path.

The third path is a path in which the high-frequency signal flows through the signal conductor 54, the external electrode 12a, the extraction conductor 20, the capacitor conductor 18, the capacitor conductor 19, the extraction conductors 24 and 25, the external electrodes 15 and 16, and the ground electrode 55 in this order. The fourth path is a path in which the high-frequency signal flows through the signal conductor 54, the external electrode 12a, the extraction conductor 20, the capacitor conductor 18, the extraction conductors 22 and 23, the external electrodes 13 and 14, the external electrodes 15 and 16, and the ground electrode 55 in this order.

As described above, in the substrate module 40b, the high-frequency signals preferably also flow through the third path and the fourth path in addition to the first path and the second path. As a result, in the substrate module 40b, while the low ESL thereof is achieved as compared to the substrate module 40a, the high-frequency characteristics thereof are improved.

In addition, in the substrate module 40b, the external electrodes 15 and 16 adjacent to the external electrodes 13 and are preferably connected to the ground electrode 55 by the solder 60c. However, the electronic component 10 is preferably fixed to the circuit substrate 51 primarily via a connection between the external electrode 12a and the signal conductor 54 and a connection between the external electrode 12b and the ground electrode 55. Therefore, it is only necessary for the external electrodes 15 and 16 to be electrically connected to the ground electrode 55, and it is not necessary for the external electrodes 15 and 16 to be rigidly fixed to the ground electrode 55. Therefore, the quantity of the solder 60c may be relatively small. Accordingly, it is unlikely that the external electrodes 13 and 14 will be connected to the external electrodes 15 and 16 by the solder 60c. Particularly, in the substrate module 40b, a short circuit is also prevented from occurring when the electronic component 10 is mounted on the circuit substrate 51.

Second Modification

Figure 10:
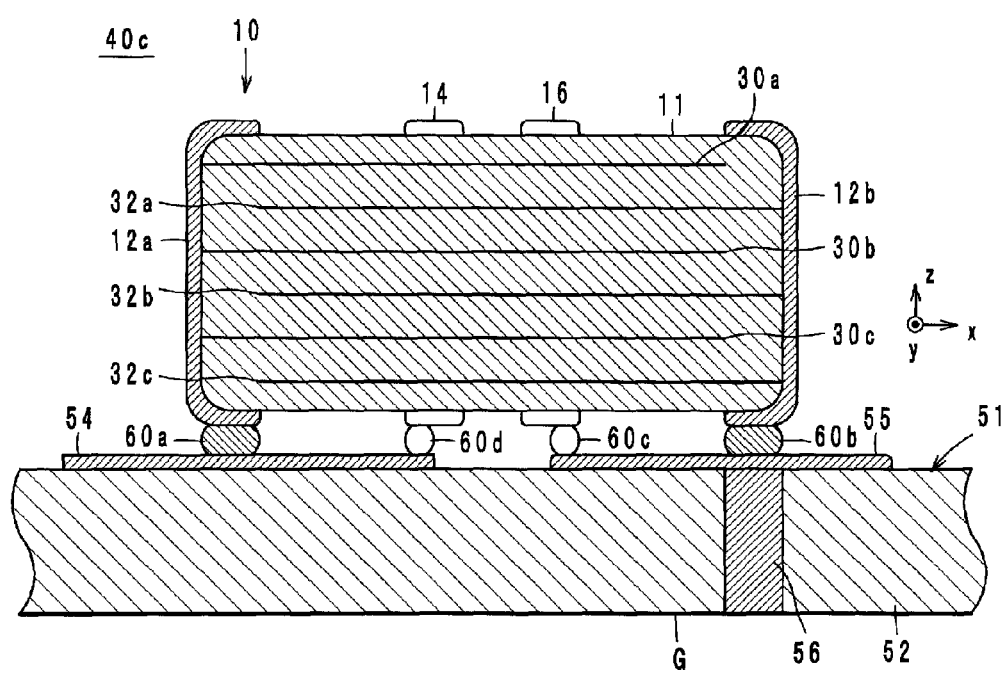
FIG. 10 is a cross-section structure diagram of a substrate module.

Next, a substrate module according to a second modification of the second preferred embodiment of the present invention will be described with reference to the drawings. FIG. 10 is the cross-sectional view of a substrate module 40c.

The substrate module 40c differs from the substrate module 40b in that the external electrodes 13 and 14 are preferably connected to the signal conductor 54 by solder 60d. Since no other differences exist, further description of the configuration of the substrate module 40c is omitted.

In the substrate module 40b, the high-frequency signals flow through from the first path to the fourth path. On the other hand, in the substrate module 40c, the high-frequency signals flow through a fifth path to a seventh path described below, in addition to the first path to the fourth path.

The fifth path is a path in which the high-frequency signal preferably flows through the signal conductor 54, the external electrodes 13 and 14, the extraction conductors 22 and 23, the capacitor conductor 18, the capacitor conductor 19, the extraction conductor 21, the external electrode 12b, and the ground electrode 55 in this order. The sixth path is a path in which the high-frequency signal preferably flows through the signal conductor 54, the external electrodes 13 and 14, the extraction conductors 22 and 23, the capacitor conductor 18, the capacitor conductor 19, the extraction conductors 24 and 25, the external electrodes 15 and 16, and the ground electrode 55 in this order. The seventh path is a path in which the high-frequency signal preferably flows through the signal conductor 54, the external electrodes 13 and 14, the external electrodes 15 and 16, and the ground electrode 55 in this order.

As described above, in the substrate module 40c, the high-frequency signals also flow through from the fifth path to the seventh path in addition to the first path to the fourth path. As a result, in the substrate module 40c, a reduced ESL is achieved as compared to the substrate module 40a, and the high-frequency characteristics thereof are improved.

In addition, in the substrate module 40c, the external electrodes 13 and 14 are connected to the signal conductor 54 by the solder 60d, and the external electrodes 15 and 16 are connected to the ground electrode 55 by the solder 60c. However, the electronic component 10 is preferably fixed to the circuit substrate 51 primarily via a connection between the external electrode 12a and the signal conductor 54 and a connection between the external electrode 12b and the ground electrode 55. Therefore, it is only necessary for the external electrodes 13 and 14 to be electrically connected to the signal conductor 54, and it is not necessary for the external electrodes 15 and 16 to be rigidly fixed to the signal conductor 54. In the same manner, it is only necessary for the external electrodes 15 and 16 to be electrically connected to the ground electrode 55, and it is not necessary for the external electrodes 15 and 16 to be rigidly fixed to the ground electrode 55. Therefore, the quantities of the solder 60c and the solder 60d may be reduced. Accordingly, it is unlikely that the external electrodes 13 and 14 are connected to the external electrodes 15 and 16 by the solder 60c and the solder 60d. Particularly, in the substrate module 40c, a short circuit is also prevented from occurring when the electronic component 10 is mounted on the circuit substrate 51.

In order to clarify the advantageous effects obtained by the electronic component 10 and the substrate modules 40b and 40c, the inventors of the present invention performed a second experiment described below. Specifically, a sample (hereinafter, the third sample) of the substrate module 40b illustrated in FIG. 9 and a sample (hereinafter, the fourth sample) of the substrate module 40c illustrated in FIG. 10 were manufactured. In addition, the ESLs and the transmission characteristics (S21) of the third sample and the fourth sample were measured. Since the parameters of the third sample and the fourth sample are the same as the parameters of the first sample and the second sample, the descriptions thereof are omitted.

In the third sample and the fourth sample, the ESLs thereof are as follows.

The ESL of the third sample: about 405 pH
The ESL of the fourth sample: about 355 pH Accordingly, based on the second experiment, it is understood that, in the substrate modules 40b and 40c, the low ESL properties are more effectively achieved as compared to the substrate module 40a.

Figure 11:
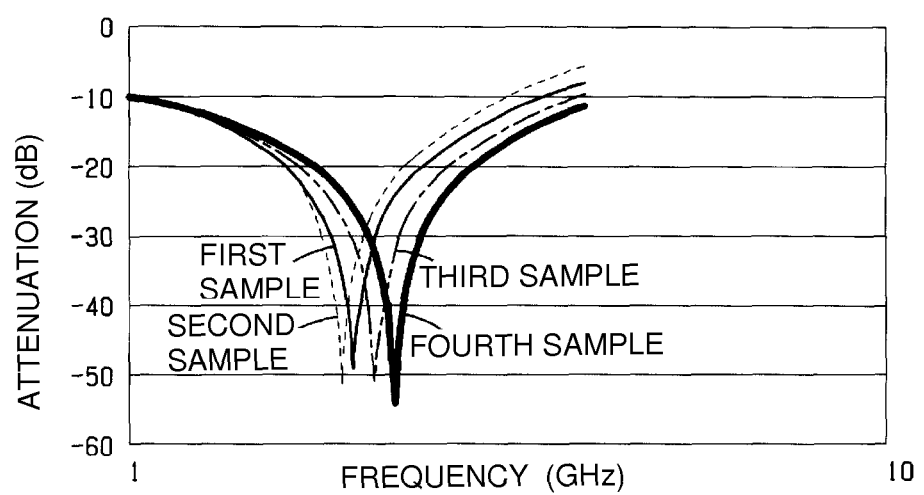
FIG. 11 is a graph illustrating transmission characteristics (S21) of a first sample to a fourth sample.

FIG. 11 is a graph illustrating the transmission characteristics (S21) of the first sample to the fourth sample. A vertical axis indicates attenuation, and a horizontal axis indicates a frequency.

According to FIG. 11, it is understood that the self-resonance frequency f3 of the third sample is higher than the self-resonance frequency f1 of the first sample. In addition, it is understood that the self-resonance frequency f4 of the fourth sample is higher than the self-resonance frequency f3 of the third sample. Specifically, the self-resonance frequency f4 is about 2.25 GHz, the self-resonance frequency f3 is about 2.115 GHz, and the self-resonance frequency f1 is about 1.975 GHz. Accordingly, based on the experimental result in FIG. 11, it is understood that the high-frequency characteristics of the substrate modules 40b and 40c are improved as compared to the high-frequency characteristic of the substrate module 40a.

Second Preferred Embodiment

Figure 12:
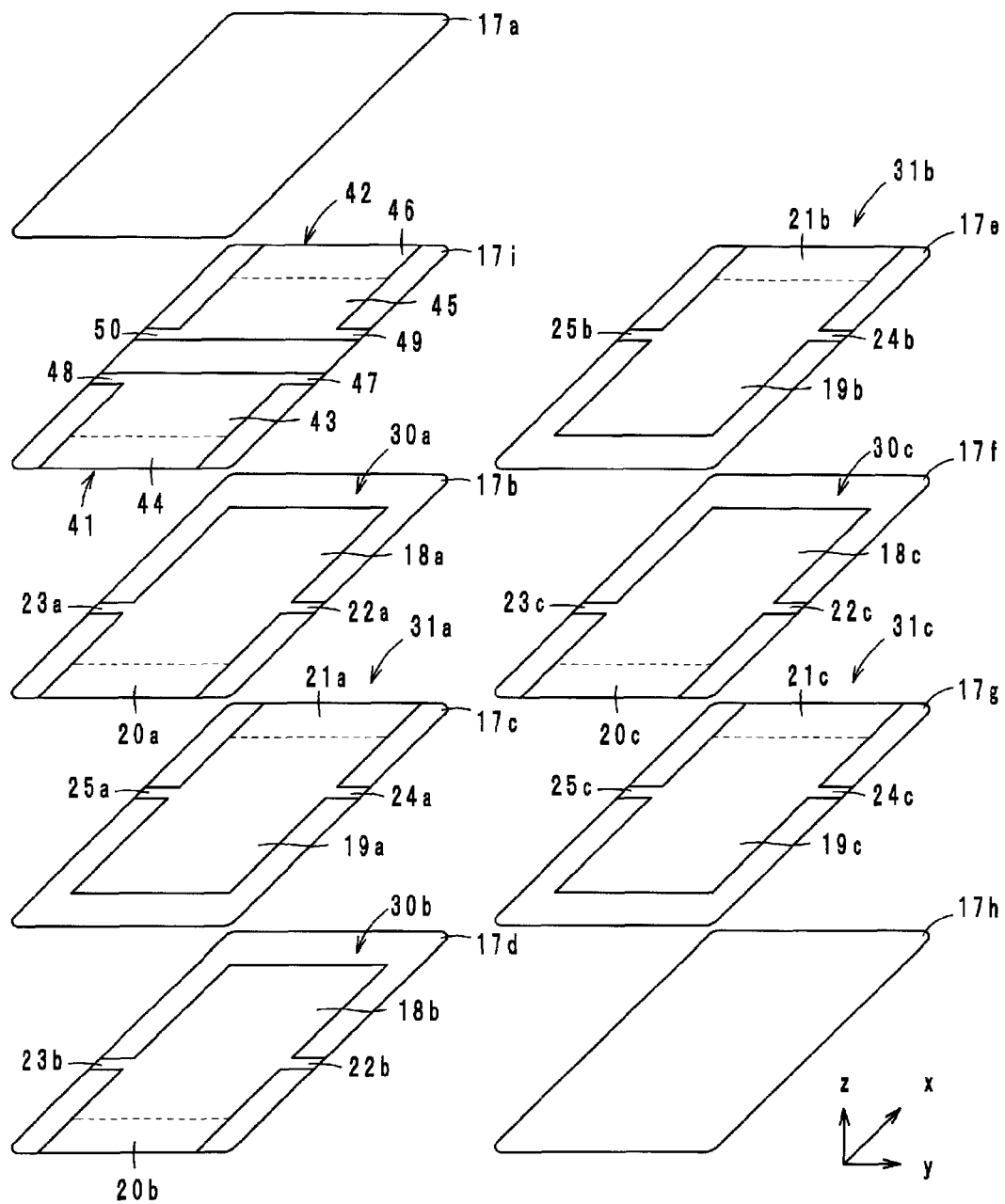
FIG. 12 is an exploded perspective view of a laminated body of an electronic component according to a second preferred embodiment of the present invention.
Figure 13:
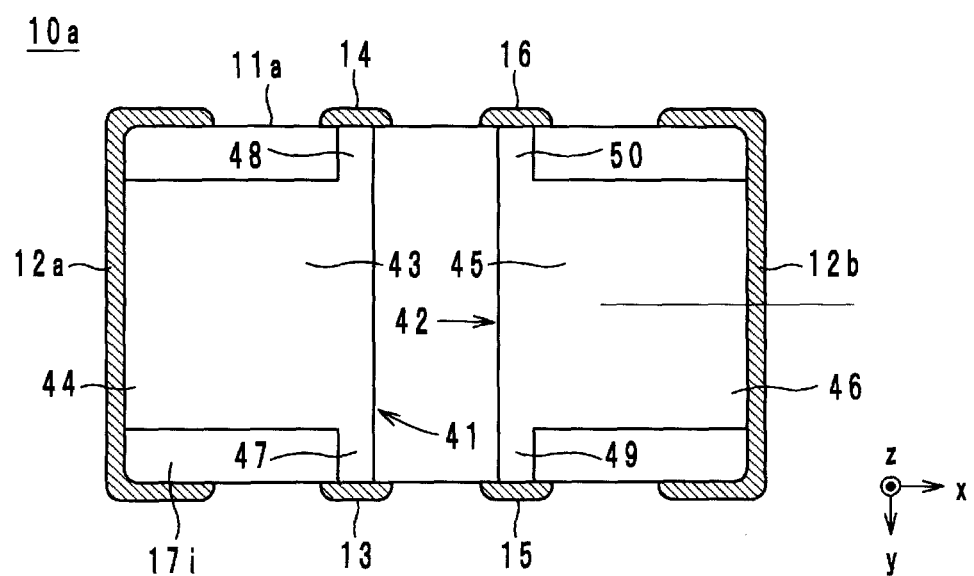
FIG. 13 is an internal plan view of the electronic component in FIG. 12.

Hereinafter, the configuration of an electronic component 10a according to a second preferred embodiment of the present invention will be described with reference to drawings. FIG. 12 is the exploded perspective view of a laminated body 11a of the electronic component 10a according to the second preferred embodiment. FIG. 13 is the internal plan view of the electronic component 10a in FIG. 12. In addition, since the external perspective view of the electronic component 10a is the same or substantially the same as the external perspective view of the electronic component 10, FIG. 1 will be referred to.

As illustrated in FIG. 12, the laminated body 11a preferably further includes a ceramic layer 17i and internal conductors 41 and 42.

As illustrated in FIG. 12, the ceramic layer 17i is provided between a ceramic layer 17a and a ceramic layer 17b. The internal conductors 41 and 42 are preferably provided on the front surface of the ceramic layer 17i, and arranged from the negative direction side in the x-axis direction to the positive direction side therein in this order in a state in which a clearance gap is provided between the internal conductors 41 and 42.

As illustrated in FIG. 12 and FIG. 13, the internal conductor 41 includes a capacitor conductor 43, and extraction conductors 44, 47, and 48. The capacitor conductor 43 preferably has a substantially rectangular shape, and provided within a half region on the negative direction side in the x-axis direction of the ceramic layer 17i.

As illustrated in FIG. 12 and FIG. 13, the extraction conductor 44 is connected to the capacitor conductor 43, and extends to the end surface S3 of the laminated body 11, thereby being exposed from the end surface S3. More specifically, the extraction conductor 44 extends from a side on the negative direction side in the x-axis direction of the capacitor conductor 43 toward the negative direction side in the x-axis direction. Accordingly, the extraction conductor 44 extends to the short side on the negative direction side in the x-axis direction of the ceramic layer 17i, and connected to the external electrode 12a.

As illustrated in FIG. 12 and FIG. 13, the extraction conductor 47 is connected to the capacitor conductor 43 and extends to the side surface S5 of the laminated body 11, thereby being exposed from the side surface S5. More specifically, the extraction conductor 47 extends from a side on the positive direction side in the y-axis direction of the capacitor conductor 43 toward the positive direction side in the y-axis direction. Accordingly, the extraction conductor 47 extends to a position, located on the negative direction side in the x-axis direction from the midpoint of the long side on the positive direction side in the y-axis direction of the ceramic layer 17i, and connected to the external electrode 13.

As illustrated in FIG. 12 and FIG. 13, the extraction conductor 48 is connected to the capacitor conductor 43 and extends to the side surface S6 of the laminated body 11, thereby being exposed from the side surface S6. More specifically, the extraction conductor 48 extends from a side on the negative direction side in the y-axis direction of the capacitor conductor 43 toward the negative direction side in the y-axis direction. Accordingly, the extraction conductor 48 extends to a position, located on the negative direction side in the x-axis direction from the midpoint of the long side on the negative direction side in the y-axis direction of the ceramic layer 17i, and connected to the external electrode 14.

As illustrated in FIG. 12 and FIG. 13, the internal conductor 42 includes a capacitor conductor 45 and extraction conductors 46, 49, and 50. The capacitor conductor 45 preferably has a substantially rectangle shape, and provided within a half region on the positive direction side in the x-axis direction of the ceramic layer 17i.

As illustrated in FIG. 12 and FIG. 13, the extraction conductor 46 is connected to the capacitor conductor 45, and extends to the end surface S4 of the laminated body 11, thereby being exposed from the end surface S4. More specifically, the extraction conductor 46 extends from a side on the positive direction side in the x-axis direction of the capacitor conductor 45 toward the positive direction side in the x-axis direction. Accordingly, the extraction conductor 46 extends to the short side on the positive direction side in the x-axis direction of the ceramic layer 17i, and connected to the external electrode 12b.

As illustrated in FIG. 12 and FIG. 13, the extraction conductor 49 is connected to the capacitor conductor 45 and extends to the side surface S5 of the laminated body 11, thereby being exposed from the side surface S5. More specifically, the extraction conductor 49 extends from a side on the positive direction side in the y-axis direction of the capacitor conductor 45 toward the positive direction side in the y-axis direction. Accordingly, the extraction conductor 49 extends to a position, located on the positive direction side in the x-axis direction from the midpoint of the long side on the positive direction side in the y-axis direction of the ceramic layer 17i, and connected to the external electrode 15.

As illustrated in FIG. 12 and FIG. 13, the extraction conductor 50 is connected to the capacitor conductor 45 and extends to the side surface S6 of the laminated body 11, thereby being exposed from the side surface S6. More specifically, the extraction conductor 50 extends from a side on the negative direction side in the y-axis direction of the capacitor conductor 45 toward the negative direction side in the y-axis direction. Accordingly, the extraction conductor 50 extends to a position, located on the positive direction side in the x-axis direction from the midpoint of the long side on the negative direction side in the y-axis direction of the ceramic layer 17i, and connected to the external electrode 16.

In the electronic component 10 including such a laminated body 11a as described above, the intensity of the high-frequency signal flowing through the second path is increased. More specifically, the high-frequency signal preferably flows through the signal conductor 54, the external electrode 12a, the extraction conductor 44, the capacitor conductor 43, the extraction conductors 47 and 48, the external electrodes 13 and 14, the external electrodes 15 and 16, the extraction conductors 49 and 50, the capacitor conductor 45, the extraction conductor 46, the external electrode 12b, and the ground electrode 55 in this order. That is, the high-frequency signal flows through a path equivalent to the second path. As a result, in the electronic component 10 including the laminated body 11a, the high-frequency characteristics thereof are improved.

Third Preferred Embodiment

Figure 14A:
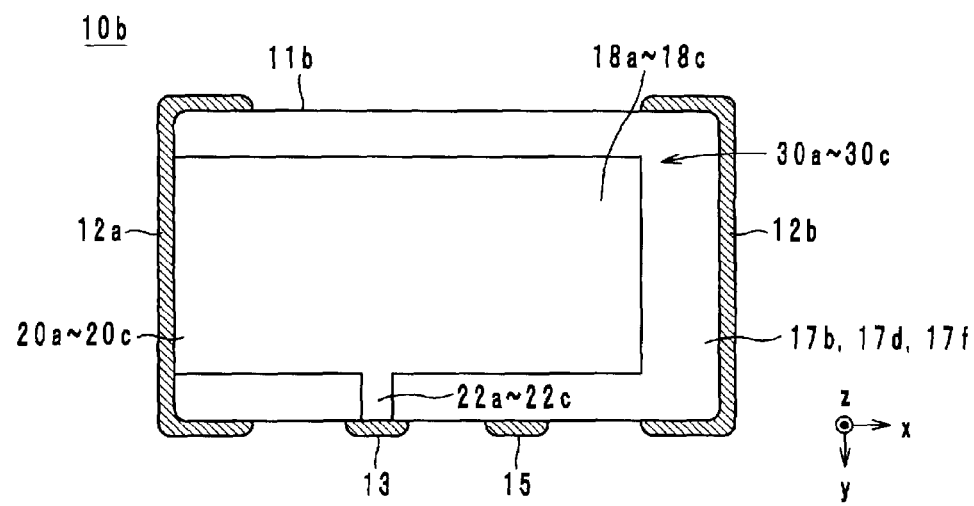
FIGS. 14A and 14B are internal plan views of an electronic component according to a third preferred embodiment of the present invention.
Figure 14B:
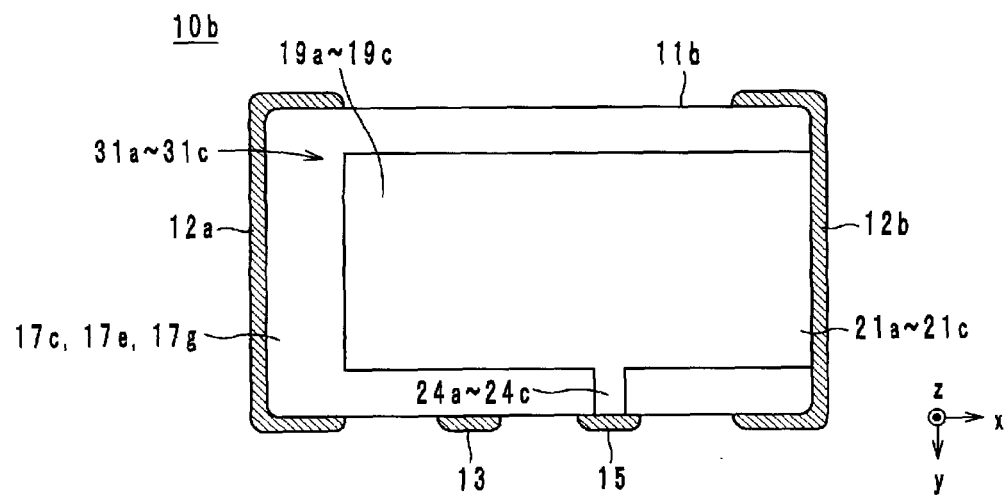

Hereinafter, the configuration of an electronic component 10b according to a third preferred embodiment of the present invention will be described with reference to drawing. FIGS. 14A and 14B are the internal plan views of the electronic component 10b according to the third preferred embodiment. In addition, since the external perspective view of the electronic component 10b is the same or substantially the same as the external appearance perspective view of the electronic component 10, FIG. 1 will be referred to.

As illustrated in FIGS. 14A and 14B, the electronic component 10b differs from the electronic component 10 in that the extraction conductors 23 and 25 are preferably not provided. In this case, the electronic component 10b is preferably mounted so that the side surface S5 faces the circuit substrate 51. Since the external electrodes 13 to 16 are not provided on the top surface S1 and the bottom surface S2 of the electronic component 10, the width of the electronic component 10 in the z-axis direction can be reduced. As a result, it is possible to arrange the electronic components 10 so that the electronic components 10 are adjacent to each other.

Fourth Preferred Embodiment

Figure 15A:
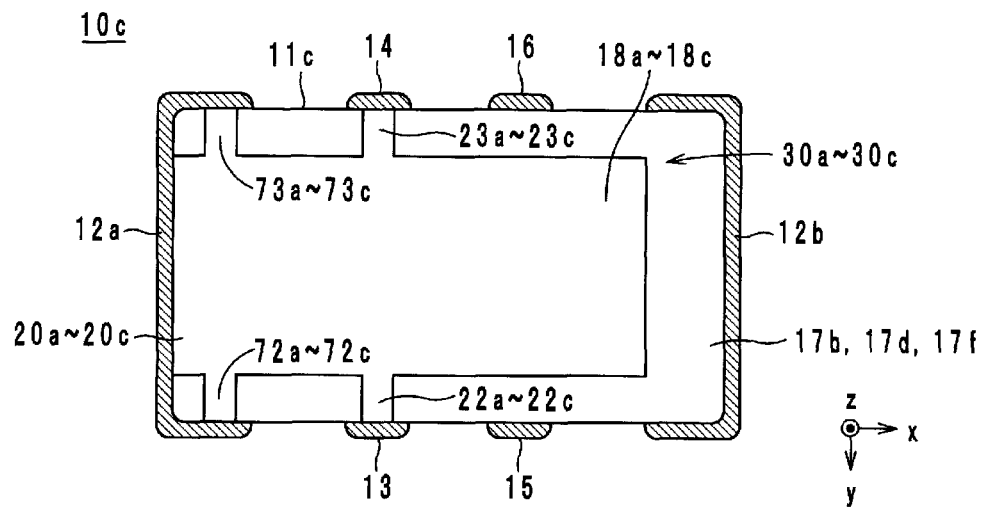
FIGS. 15A and 15B are internal plan views of an electronic component according to a fourth preferred embodiment of the present invention.
Figure 15B:
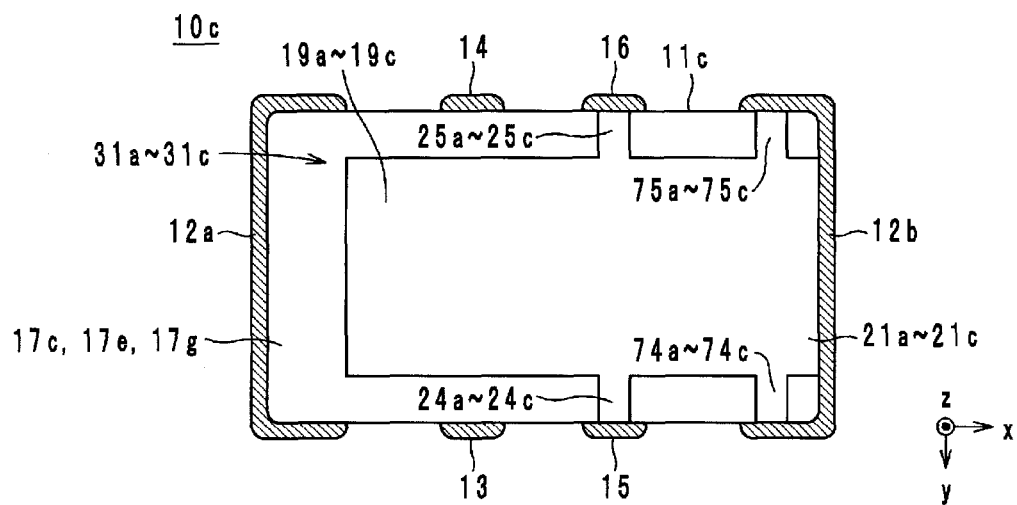

Hereinafter, the configuration of an electronic component 10c according to a fourth preferred embodiment of the present invention will be described with reference to the drawings. FIGS. 15A and 15B are internal plan views of the electronic component 10c according to the fourth preferred embodiment. In addition, since the external perspective view of the electronic component 10c is the same or substantially the same as the external appearance perspective view of the electronic component 10, FIG. 1 will be referred to.

The electronic component 10c differs from the electronic component 10 in that the electronic component 10c preferably includes extraction conductors 72 (72a to 72c), 73 (73a to 73c), 74 (74a to 74c), and 75 (75a to 75c).

The extraction conductor 72 is connected to the connection conductor 20, and extends to the side surface S5 of the laminated body 11c, thereby being exposed from the side surface S5. More specifically, the extraction conductor 72 extends from the midpoint of a side on the positive direction side in the y-axis direction of the connection conductor 20 toward the positive direction side in the y-axis direction. Accordingly, the extraction conductor 72 extends to a position on the long side on the positive direction side in the y-axis direction of the ceramic layer 17, the position being located on the negative direction side in the x-axis direction from the extraction conductor 22, and the extraction conductor 72 is connected to the external electrode 12a.

The extraction conductor 73 is connected to the connection conductor 20 and extends to the side surface S6 of the laminated body 11c, thereby being exposed from the side surface S6. More specifically, the extraction conductor 73 extends from the midpoint of a side on the negative direction side in the y-axis direction of the connection conductor 20 toward the negative direction side in the y-axis direction. Accordingly, the extraction conductor 73 extends to a position on the long side on the negative direction side in the y-axis direction of the ceramic layer 17, the position being located on the negative direction side in the x-axis direction from the extraction conductor 23, and the extraction conductor 73 is connected to the external electrode 12a.

The extraction conductor 74 is connected to the connection conductor 21 and extends to the side surface S5 of the laminated body 11c, thereby being exposed from the side surface S5. More specifically, the extraction conductor 74 extends from the midpoint of a side on the positive direction side in the y-axis direction of the connection conductor 21 toward the positive direction side in the y-axis direction. Accordingly, the extraction conductor 74 extends to a position on the long side on the positive direction side in the y-axis direction of the ceramic layer 17, the position being located on the negative direction side in the x-axis direction from the extraction conductor 24, and the extraction conductor 74 is connected to the external electrode 12b.

The extraction conductor 75 is connected to the connection conductor 21 and extends to the side surface S6 of the laminated body 11c, thereby being exposed from the side surface S6. More specifically, the extraction conductor 75 extends from the midpoint of a side on the negative direction side in the y-axis direction of the connection conductor 21 toward the negative direction side in the y-axis direction. Accordingly, the extraction conductor 75 extends to a position on the long side on the negative direction side in the y-axis direction of the ceramic layer 17, the position being located on the positive direction side in the x-axis direction from the extraction conductor 25, and the extraction conductor 75 is connected to the external electrode 12b.

Since the extraction conductors 72 to 75 are provided in the electronic component 10c, the number of current paths within the electronic component 10c is greater than the number of current paths within the electronic component 10. As a result, in the electronic component 10c, the low ESL property is more effectively achieved.

In addition, in the electronic component 10c, it is preferable that the extraction conductors 72 to 75 are not provided at the corner of the ceramic layer 17.

Fifth Preferred Embodiment

Figure 16:
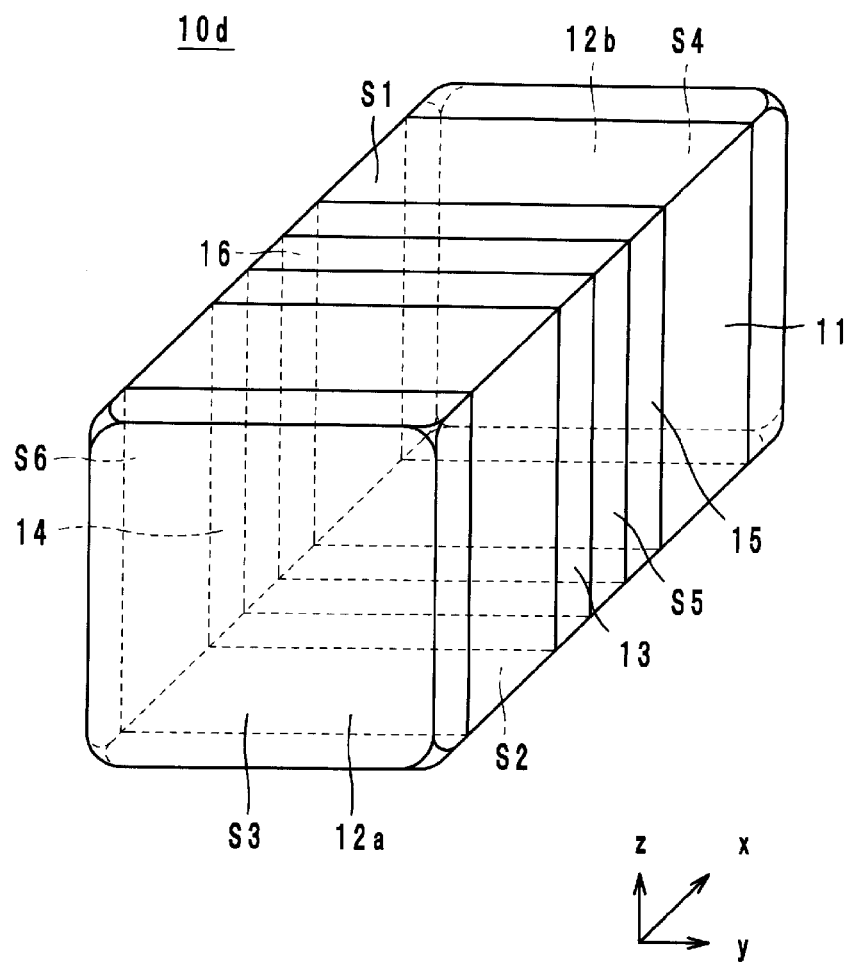
FIG. 16 is an external perspective view of an electronic component according to a fifth preferred embodiment of the present invention.

Hereinafter, the configuration of an electronic component 10d according to a fifth preferred embodiment of the present invention will be described with reference to the drawings. FIG. 16 is the external appearance perspective view of the electronic component 10d according to the fifth preferred embodiment.

As illustrated in FIG. 16, the external electrode 13 and the external electrode 14 may preferably be connected to each other using external electrodes provided on the top surface S1 and the bottom surface S2. In the same manner, the external electrode 15 and the external electrode 16 may be connected to each other using external electrodes provided on the top surface S1 and the bottom surface S2. In addition, the inner structure of the electronic component 10d may be any one of the inner structures of the electronic components 10 and 10a to 10c.

Sixth Preferred Embodiment

Figure 17:
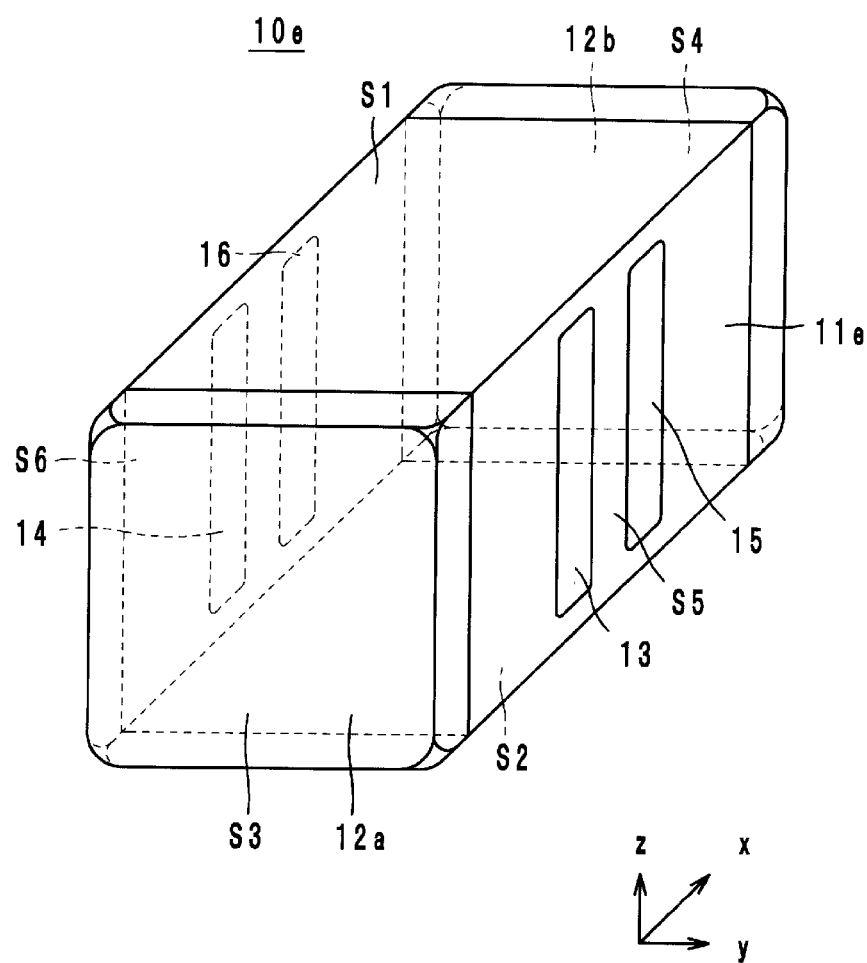
FIG. 17 is an external perspective view of an electronic component according to a sixth preferred embodiment of the present invention.
Figure 18:
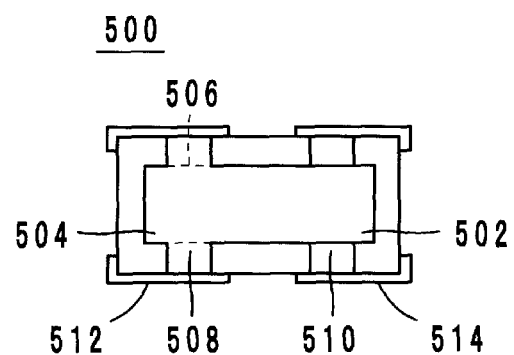
FIG. 18 is a front view of a multilayer capacitor described in Japanese Unexamined Patent Application Publication No. 2004-140183.

Hereinafter, the configuration of an electronic component 10e according to a sixth preferred embodiment of the present invention will be described with reference to a drawing. FIG. 17 is the external appearance perspective view of the electronic component 10e according to the sixth preferred embodiment.

As illustrated in FIG. 17, each of the external electrodes 13 and 15 may preferably be only provided on the side surface S5 and may not extend to the top surface S1 or the bottom surface S2. In the same manner, each of the external electrodes 14 and 16 may preferably be only provided on the side surface S6 and may not extend to the top surface S1 or the bottom surface S2.

When the distance between the external electrodes 13 and 15 and the distance between the external electrodes 14 and 16 are reduced, the external electrodes 13 to 16 may be formed using direct plating, for example. In the direct plating, the external electrodes 13 to 15 are preferably formed so that the extraction conductors 22 to 25 cover exposed portions. Accordingly, in this case, the external electrodes 13 to 15 are not formed on the top surface S1 and the bottom surface S2.

The electronic components 10 and 10a to 10e and the substrate modules 40a to 40c according to various preferred embodiments of the present invention are not limited to those illustrated in the above-mentioned preferred embodiments, and modifications may be made within the scope of the present invention.

In addition, instead of the ceramic layer 17, a resin material, such as epoxy resin, polypropylene, or other suitable material may be used.

As described above, preferred embodiments of the present invention are useful for an electronic component and a substrate module, and in particular, have advantages in that low ESL properties are achieved and a short circuit is prevented from occurring when the electronic component and the substrate module are mounted on a circuit substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a substantially rectangular parallelepiped-shaped laminated body including a plurality of dielectric layers that are laminated on each other;
a first capacitor conductor provided on a first dielectric layer of the plurality of dielectric layers;
a first extraction conductor connected to the first capacitor conductor and extending to a first end surface of the laminated body;
a third extraction conductor connected to the first capacitor conductor and extending to a first side surface of the laminated body;
a second capacitor conductor provided on a second dielectric layer of the plurality of dielectric layers and facing the first capacitor conductor across the first dielectric layer;
a second extraction conductor connected to the second capacitor conductor and extending to a second end surface of the laminated body;
a fourth extraction conductor connected to the second capacitor conductor and extending to the first side surface;
a first external electrode and a second external electrode arranged so as to extend to the first end surface and the second end surface, respectively, and to a bottom surface of the laminated body and connected to the first extraction conductor and the second extraction conductor, respectively;
a third external electrode provided on the first side surface and connected to the third extraction conductor;
a fourth external electrode provided on the first side surface and connected to the fourth extraction conductor;
a fifth extraction conductor connected to the first capacitor conductor and extending to a second side surface of the laminated body;
a sixth extraction conductor connected to the second capacitor conductor and extending to the second side surface;
a fifth external electrode provided on the second side surface and connected to the fifth extraction conductor; and
a sixth external electrode provided on the second side surface and connected to the sixth extraction conductor; wherein
the third external electrode faces the fifth external electrode;
the first external electrode, the third external electrode, and the fifth external electrode have the same electrical potential;
the fourth external electrode faces the sixth external electrode;
the second external electrode, the fourth external electrode, and the sixth external electrode have the same electrical potential;
a distance between the third external electrode and the fourth external electrode is smaller than a distance between the first external electrode and third external electrode, and than a distance between the second external electrode and the fourth external electrode;
a distance between the fifth external electrode and the sixth external electrode is smaller than a distance between the first external electrode and fifth external electrodes, and than a distance between the second external electrode and the sixth external electrode;
no external electrode having an electrical potential different from an electrical potential of the third external electrode is provided between the first end surface and the third external electrode, on the first side surface;
no external electrode having an electrical potential different from an electrical potential of the fourth external electrode is provided between the second end surface and the fourth external electrode, on the first side surface;
a width of the first extraction conductor is greater than a width of the third extraction conductor;
a width of the second extraction conductor is greater than a width of the fourth extraction conductor;
the width of the first extraction conductor is the same as a width of the first capacitor conductor; and
the width of the second extraction conductor is the same as a width of the second capacitor conductor.

2. The electronic component according to claim 1, wherein no external electrode having an electrical potential different from electrical potentials of the third external electrode and the fourth external electrode is provided between the third external electrode and the fourth external electrode, on the first side surface.

3. The electronic component according to claim 1, wherein:
no external electrode having an electrical potential different from an electrical potential of the fifth external electrode is provided between the first end surface and the fifth external electrode, on the second side surface; and
no external electrode having an electrical potential different from an electrical potential of the sixth external electrode is provided between the second end surface and the sixth external electrode, on the second side surface.

4. A substrate module comprising:
a circuit substrate including a first land and a second land; and
the electronic component according to claim 1 mounted in the circuit substrate; wherein
the first external electrode is connected to the first land; and
the second external electrode is connected to the second land.

5. The substrate module according to claim 4, wherein the fourth external electrode is connected to the second land.

6. The substrate module according to claim 5, wherein the third external electrode is connected to the first land.

* * * * *